United States Patent [19]
Doi et al.

[11] 4,245,891
[45] Jan. 20, 1981

[54] ZOOM LENS SYSTEM WITH A MOVABLE DISTORTION-CORRECTING ELEMENT

[75] Inventors: Yoshikazu Doi; Kenzo Sado, both of Omiya, Japan

[73] Assignee: Fuji Photo Optical Co., Ltd., Omiya, Japan

[21] Appl. No.: 911,173

[22] Filed: May 31, 1978

[30] Foreign Application Priority Data

May 31, 1977 [JP] Japan .................................. 52/63594

[51] Int. Cl.³ .............................................. G02B 15/18
[52] U.S. Cl. ...................................... 350/184; 350/189
[58] Field of Search ......................... 350/184, 186, 189

[56] References Cited
U.S. PATENT DOCUMENTS

| | | | |
|---|---|---|---|
| 3,705,759 | 12/1972 | Cook | 350/186 |
| 4,099,845 | 7/1978 | Takesi | 350/184 |
| 4,145,115 | 3/1979 | Betensky | 350/184 |

Primary Examiner—Conrad J. Clark

[57] ABSTRACT

A zoom lens system having a wide angle of view, a large diameter and a large zooming ratio in which the distortion is well corrected. The zoom lens system includes a movable lens group and a fixed lens group for zooming. A relay lens is provided behind the zooming lens group. A compensating lens having a small refractive power is inserted between the movable lens group and the fixed lens group and is moved in association with the zooming operation. The compensating lens consists of an aspherical lens of small refractive power or a group of spherical lenses having a small refractive power as a whole. The compensating lens is located at a position between the movable lens group and the fixed lens group where the light flux advancing along the optical axis of the zoom lens system converges to the image side.

4 Claims, 28 Drawing Figures

F/2.1 F/3 −0.5 0 0.5mm 68.5° 50.4° −0.5 0 0.5mm 68.5° 50.4° −5 0 5%

F/2.1 F/3 −0.5 0 0.5mm 15.5° 11.1° −0.5 0 0.5mm 15.5° 11.1° −5 0 5%

ZOOM LENS SYSTEM WITH A MOVABLE DISTORTION-CORRECTING ELEMENT

BACKGROUND OF THE INVENTION

1. Field of the Invention

This invention relates to a zoom lens system, and more particularly to a zoom lens system which has a large zooming ratio, a large diameter and a wide angle of field of view. In particular, the present invention is concerned with correction of the distortion of the zoom lens.

2. Description of the Prior Art

A variable magnification lens system is called zoom lens. The conventional zoom lens systems are suffering from the defect that the distortion cannot be completely removed, particularly in case that the whole size of the zoom lens system is made compact. Therefore, it has been very difficult to provide a zoom lens system of small size having a zooming ratio of not less than 10, a wide angle of view of not less than 60°, a large lens diameter and a large range of focusing capable of focusing an image of an object at a short distance of not more than 1 m. In a zoom lens system which satisfies the above conditions suffers from a distortion fluctuating from −5% to 30 5% as shown in U.S. Pat. No. 3,705,759.

The problem of the distortion will hereinbelow be described in detail with reference to FIG. 1. FIG. 1 is a longitudinal view of a conventional zoom lens system for explaining the above described problem. The above mentioned problem that the distortion increases when the angle of view is made larger than 60° at the wide angle side in a zoom lens system which has a large diameter and large range of variation of magnification and is capable of focusing up to short distance is explained as follows. In order to correct aberrations for both the long distance and the short distance in the telescopic side of the zoom lens having a large diameter and a large range of variation of magnification, the shape of the lens group having a large diameter which is sensitive to the aberrations in the telescopic side is almost automatically determined. Therefore, the degree of freedom in design of the lens system for correction of the distortion in the wide angle side is very limited. Thus, the distortion increases as the size of the whole zoom lens system is made small in the above described type of zoom lens system.

With reference to FIG. 1, the diameter of the light flux is as large as the effective diameter of the zoom lens system as shown by C or C' in the telescopic side, i.e. narrow angle side. Therefore, in this stage the shape of the lenses has a great effect upon the spherical aberration. On the other hand, in the wide angle side, the light flux has a small diameter as shown by A or A'. The light flux A which advances along the optical axis of the zoom lens system is not affected by the shape of the lenses, but the light flux A' which advances obliquely with respect to the optical axis of the zoom lens system is greatly affected by the lens shape. Particularly, since the diameter of the lens system is very large in this type of the lens system, the light flux A' could have a large angle with respect to the optical axis. Therefore, the zoom lens system involving light fluxes inclined at such large angles with respect to the optical axis is very sensitive to the distortion. The spherical aberration, on the other hand, can be well corrected in the telescopic side if the refractive power of the lens L1 is made small, the refractive power of the lens L3 is further increased and the shape of the lenses L1 and L3 is made concave to the object side, which however all deteriorate the distortion.

Further, all the conditions for making the diameter of the lens system large, making the zooming ratio large and making the size of the lens system small result in enlargement of the diameter of the light fluxes C and C' in the telescopic side which results in increase in the negative distortion. In the wide angle side end, however, the negative distortion can be corrected independently of the correction thereof in the telescopic side, since the oblique light flux A' passes through the lens surface at different position from that at which the marginal light rays of the large light flux C passes and the light flux A' is highly sensitive to distortion.

However, even if the negative distortion can be corrected in the wide angle side end while controlling the distortion in the telescopic side as mentioned above, a positive distortion remains greatly in the wide angle side. The light flux B' passing the marginal portion of the image on the focal plane on which the positive distortion is maximized passes through almost the same position of the lens system as the marginal light rays of the light flux C advancing along the optical axis of the lens system in the telescopic side. Further, the angle of view of the light flux B' is small. Therefore, the light flux B' does not have a great effect upon the distortion. Accordingly, it is difficult to correct the positive distortion while sufficiently controlling the aberration in the telescopic side.

SUMMARY OF THE INVENTION

The primary object of the present invention, therefore, is to provide a zoom lens system in which the distortion which greatly changes from negative to positive in the wide angle side is effectively corrected.

The above object is accomplished by providing a compensating lens consisting of an aspheric lens having a small refractive power or a spheric lens group having a small effective refractive power in a space between a movable lens group and a fixed lens group where the light flux advancing along the optical axis of the zoom lens system converges to the image side, and moving the compensating lens in association with a zooming operation.

DESCRIPTION OF THE PREFERRED EMBODIMENTS

Figure 2:
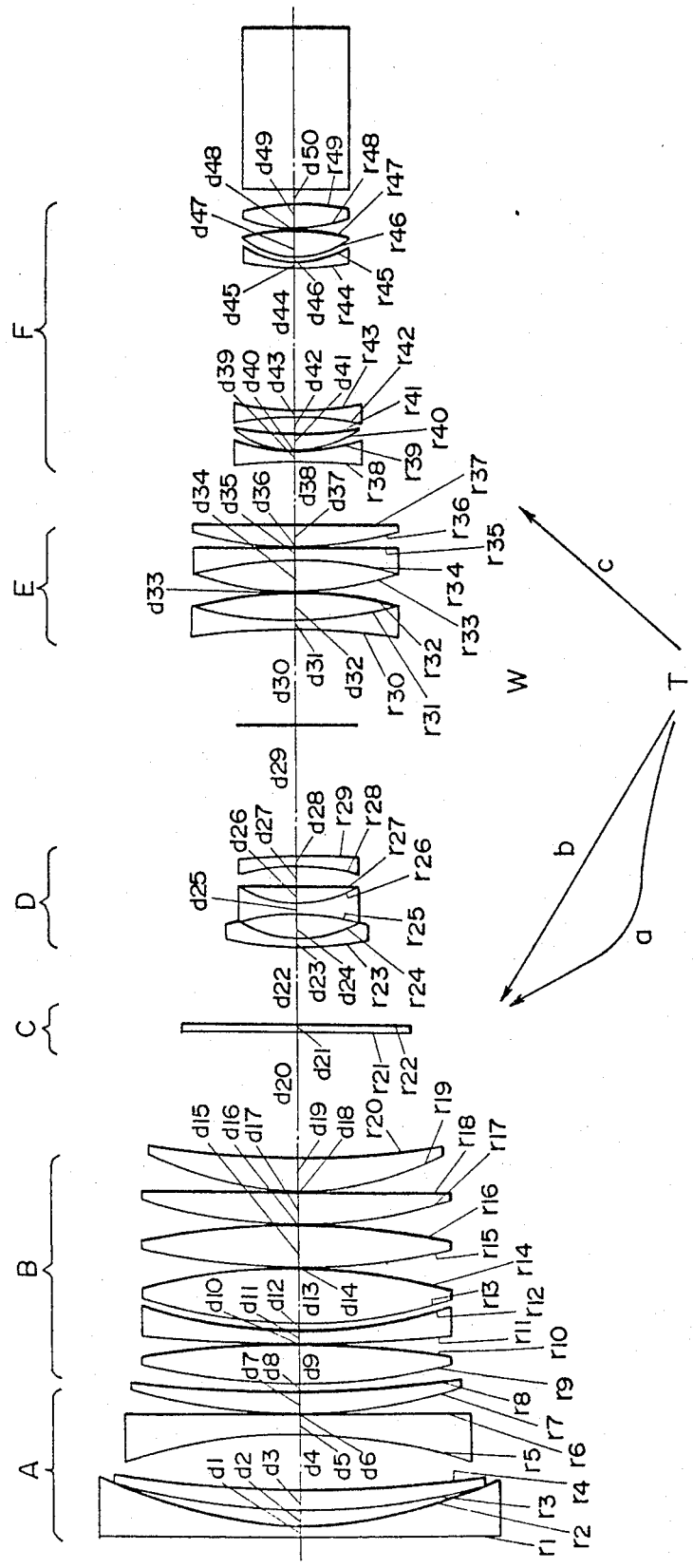
FIG. 2 is a longitudinal sectional view of an embodiment of the zoom lens system in accordance with the present invention.

Referring to FIG. 2, the zoom lens system in accordance with the present invention consists of a focusing lens systems A and B, a zooming lens systems D and E, and a relay lens system F. The focusing lens systems A and B constitute a fixed lens group and the zooming lens systems D and E constitute a movable lens group. Between the movable lens group and the fixed lens group is provided a compensating lens C. The compensating lens C is located at a position where the light flux advancing along the optical axis converges to the image side. The compensating lens C consists of an aspherical lens having a small refractive power and is moved in association with the zooming operation of the zoom lens system. By means of this compensating lens C, the variation in distortion accompanying the zooming operation is corrected.

Figure 1:
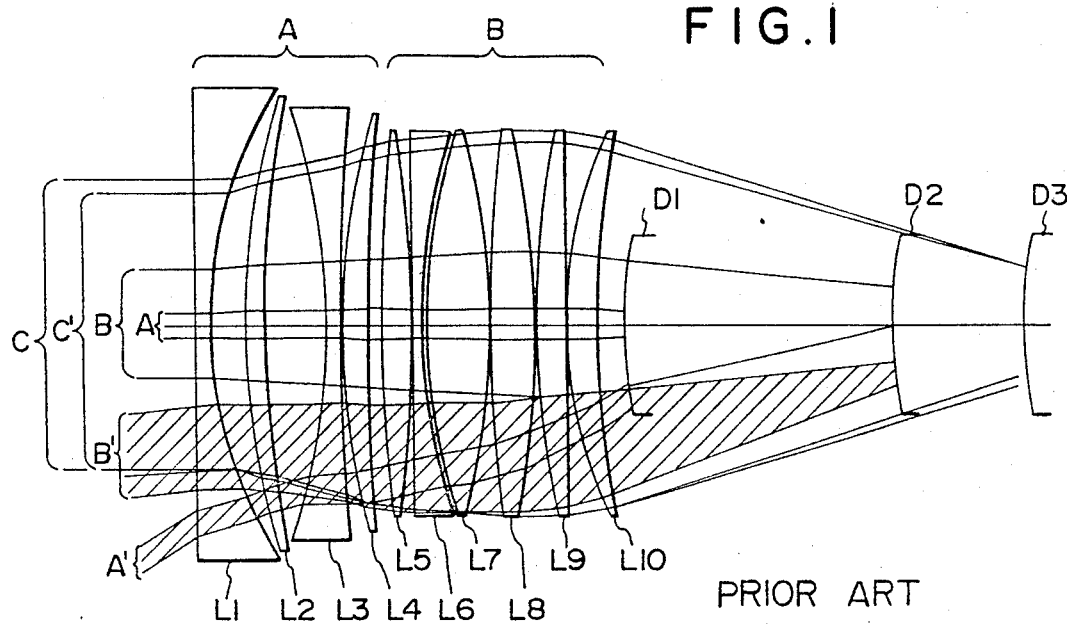
FIG. 1 is a longitudinal view of a conventional zoom lens system for explaining the problem inherent in the conventional zoom lens system having a wide angle of view, large range of variation in magnification and large range of focusing up to a short distance of less than 1 m wherein light fluxes A and A' indicate the light flux advancing along the optical axis of the lens system and the light flux oblique to the optical axis respectively in the wide angle end, B and B' indicate the light flux advancing along the optical axis and the oblique light flux respectively in the wide angle side, and C and C' indicate the light flux advancing along the optical axis and the oblique light flux respectively in the telescopic side.

In the zooming operation from telescopic side to wide angle side, the movable lens system D is moved in the direction of the arrow (b), the movable lens system E is moved in the direction of the arrow (c), and the compensating lens C is moved in the direction of the arrow (a). Therefore, in the wide angle side the light flux passing the marginal portion on the focusing plane (corresponding to light flux A' in FIG. 1) passes through the compensating lens C at a position away from the optical axis, and accordingly the positive distortion is effectively compensated. This effect is further enhanced when the compensating lens C is separated from the iris of the zoom lens system to some extent.

In the wide angle end, the compensating lens C acts to increase the negative distortion. However, since the light flux passing the marginal portion on the focal plane passes through the compensating lens C at a position comparatively close to the optical axis, the positive distortion is not corrected so much. Further, the negative distortion can be corrected independently of the spherical aberration in the telescopic side as mentioned before.

Further, in the telescopic side, the compensating lens C is moved in the direction in which the light flux advancing along the optical axis in the telescopic side converges so that the influence of the compensating lens C upon the aberration in the telescopic side is minimized. Therefore, the light flux passes through the compensating lens C at the position close to the optical axis and the influence upon the aberration in the telescopic side is made so small that it can be freely corrected by other lenses.

By making the refractive power of the compensating lens small as a whole, the effect upon the aberration in the telescopic side and the chromatic aberration is made small. Further, thereby the correction of aberrations is increased without effecting the amount of movement of the lens group D and E in the zooming operation.

Now an embodiment of the zoom lens system in accordance with this invention will be described in Table I. In the Table I, the radii of curvature of the refracting surfaces, the axial air separations or thicknesses or lenses, the refractive indices for the sodium d-line and the Abbe dispersion numbers are respectively designated at R, d, n and ν which are numbered, respectively, by subscripts in order from front to rear.

TABLE I f = 16.5–500 F: 12.1
zooming ratio: 30.3 ×
angle of view: 65°56'–2°27'

| No. | R | d | n | ν |
|---|---|---|---|---|
| 1 | 2225.27 | 5.0 | 1.71300 | 53.9 |
| 2 | 131.30 | 12.74 | | |
| 3 | 245.15 | 7.50 | 1.80518 | 25.5 |
| 4 | 411.66 | 21.26 | | |
| 5 | −229.08 | 5.0 | 1.71300 | 53.9 |
| 6 | 1544.05 | 0.75 | | |
| 7 | 270.44 | 8.0 | 1.80518 | 25.5 |
| 8 | 1097.59 | 3.93 | | |
| 9 | 454.71 | 10.0 | 1.62041 | 60.3 |
| 10 | −507.92 | 0.2 | | |
| 11 | −3554.02 | 4.2 | 1.80518 | 25.5 |
| 12 | 203.85 | 0.62 | | |
| 13 | 209.08 | 22.0 | 1.43386 | 95.2 |
| 14 | −227.27 | 0.2 | | |
| 15 | 574.25 | 15.0 | 1.43386 | 95.2 |
| 16 | −273.63 | 0.2 | | |
| 17 | 270.56 | 10.5 | 1.43386 | 95.2 |
| 18 | 4899.63 | 0.2 | | |
| 19 | 151.47 | 9.5 | 1.62041 | 60.3 |
| 20 | 334.52 | (d20) | | |
| 21 | aspheric | 2.0 | 1.51633 | 64.0 |
| 22 | ∞ | (d22) | | |
| 23 | 136.40 | 2.0 | 1.71300 | 53.9 |
| 24 | 42.12 | 10.5 | | |
| 25 | −96.98 | 2.0 | 1.73400 | 51.3 |
| 26 | 38.05 | 9.5 | 1.80518 | 25.5 |
| 27 | −622.59 | 5.0 | | |
| 28 | −90.38 | 2.0 | 1.71300 | 53.9 |
| 29 | 358.25 | (d29) | | |
| 30 | iris | (d30) | | |
| 31 | −356.55 | 2.0 | 1.74000 | 28.2 |
| 32 | 130.08 | 15.0 | 1.73400 | 51.3 |
| 33 | −97.80 | 0.2 | | |
| 34 | 132.19 | 15.5 | 1.69100 | 54.8 |
| 35 | −94.21 | 2.0 | 1.74000 | 28.2 |
| 36 | 7760.09 | 0.2 | | |
| 37 | 134.48 | 8.0 | 1.62041 | 60.2 |
| 38 | 4380.76 | (d38) | | |
| 39 | −150.33 | 2.0 | 1.71300 | 53.9 |
| 40 | 64.90 | 0.2 | | |
| 41 | 44.23 | 6.0 | 1.80518 | 25.5 |
| 42 | 146.86 | 5.0 | | |
| 43 | −212.80 | 2.0 | 1.62041 | 60.3 |
| 44 | 113.87 | 50.0 | | |
| 45 | 134.20 | 2.0 | 1.80518 | 25.5 |
| 46 | 37.97 | 1.5 | | |
| 47 | 41.32 | 10.0 | 1.51742 | 52.2 |
| 48 | −105.10 | 0.2 | | |
| 49 | 154.39 | 7.5 | 1.51742 | 52.2 |
| 50 | −146.54 | | | |
| 51 | ∞ | 69.2 | 1.51633 | 64.0 |
| 52 | ∞ | | | |
| | f = 16.5 | f = 76.3 | f = 288 | f = 528 |
| d20 | 6.000 | 71.783 | 131.944 | 140.825 |
| d22 | 1.000 | 26.000 | 1.000 | 1.000 |
| d29 | 163.696 | 60.547 | 14.639 | 0.872 |
| d30 | 50.000 | 41.149 | 19.550 | 2.725 |

TABLE I-continued f = 16.5-500 F: 12.1
zooming ratio: 30.3 ×
angle of view: 65°56'–2°27'

| No. | R | d | n | ν |
|---|---|---|---|---|
| d38 | 7.500 | 28.717 | 61.064 | 82.775 | aspheric surface
$X = A_2y^2 + A_4y^4 + A_6y^6 + A_8y^8 + A_{10}y^{10}$
$R_{21} = \infty$
$A_2 = 0$
$A_4 = -6.55424 \cdot 10^{-8}$
$A_6 = 2.730667 \cdot 10^{-11}$
$A_8 = -4.23002 \cdot 10^{-15}$ where y is a distance in the direction perpendicular to the optical axis and X is a distance from the vertex of the surface in the direction of the optical axis.

Figure 3:
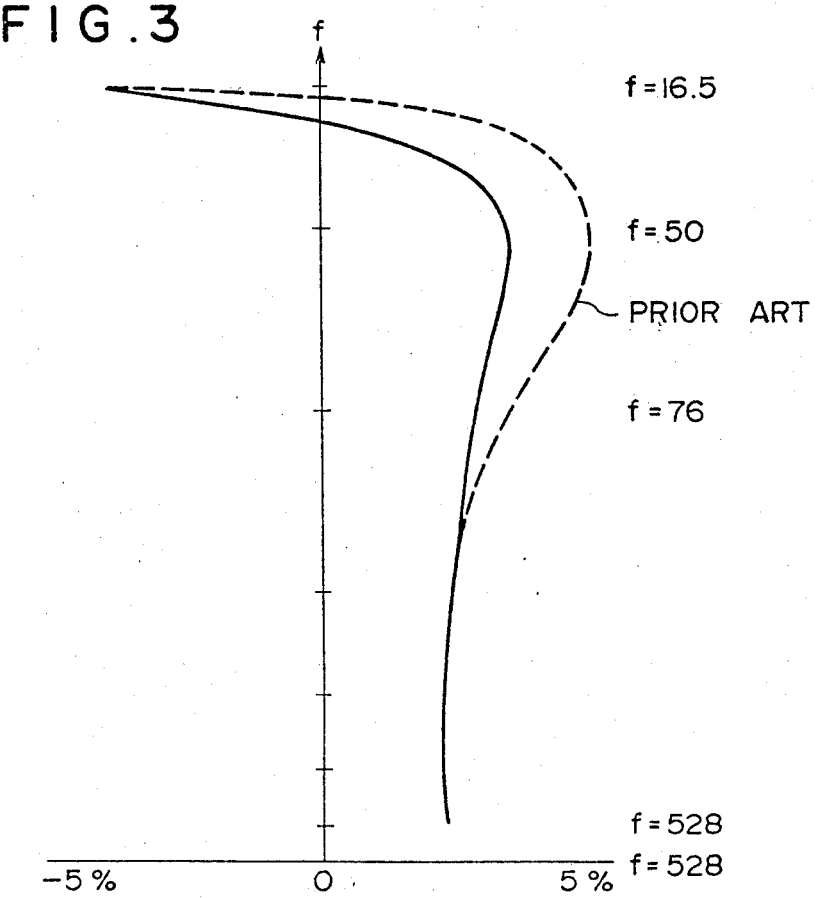
FIG. 3 is a graphical representation of the distortion of the zoom lens system as shown in FIG. 2, FIGS. 4A to 4C, 5A to 5C, 6A to 6C, and 7A to 7C represent the spherical aberration (A), astigmatism (B) and distortion (C) of the zoom lens system as shown in FIG. 2 for different focal lengths; 4A–4C for f−16.5, 5A–5C for f=76.3, 6A–6C for f=288 and 7A–7C for 528 all in terms of mm.

The distortion observed in the above described embodiment of the invention is shown in FIG. 3. In FIG. 3, the broken line indicates the distortion observed in the conventional zoom lens system and the solid line indicates the corrected distortion in the presevent invention. From FIG. 3, it is shown that the distortion is well corrected in the wide angle side of about f=50 mm and that the distortion is corrected more than the conventional zoom lens system in the wide angle end in spite of the wide angle of about 70°.

Figure 4A:
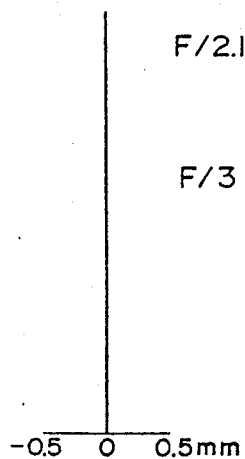
Figure 4B:
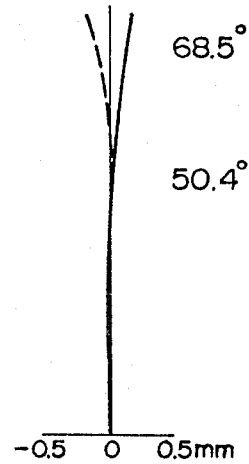
Figure 4C:
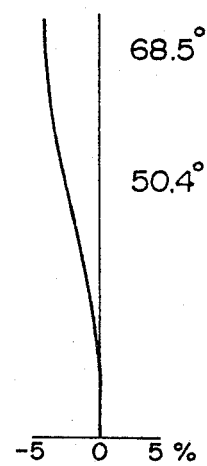
Figure 5A:
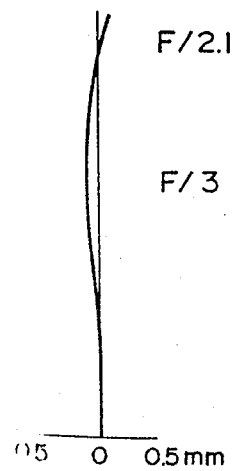
Figure 5B:
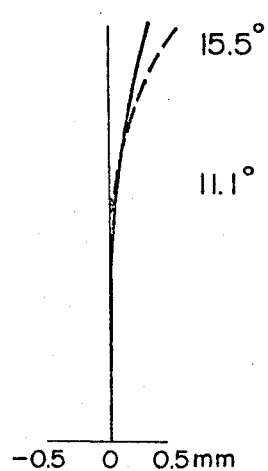
Figure 5C:
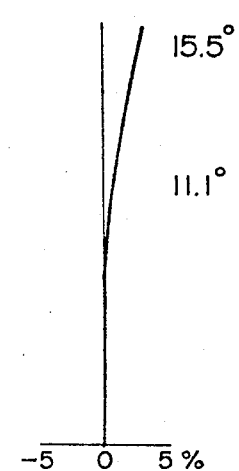
Figure 6A:
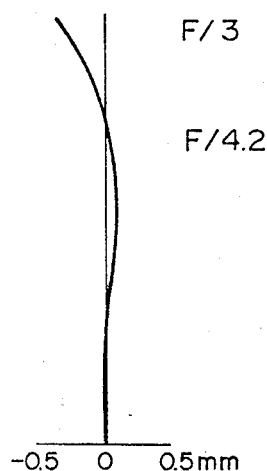
Figure 6B:
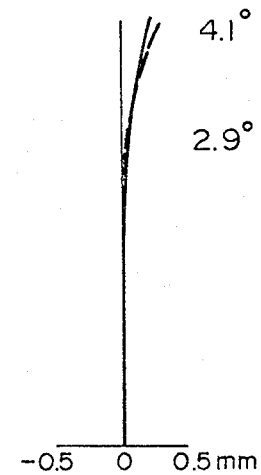
Figure 6C:
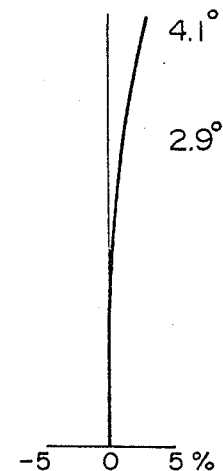
Figure 7A:
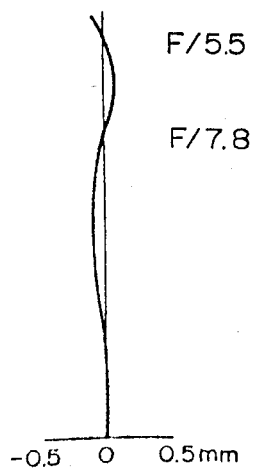
Figure 7B:
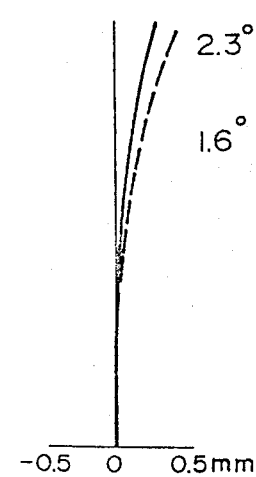
Figure 7C:
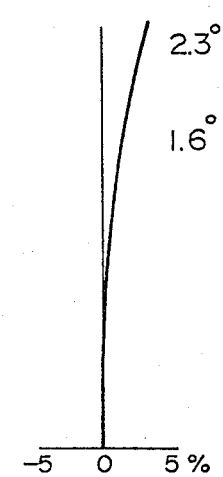

FIGS. 4A to 7C show the various aberrations corrected in accordance with the present invention. FIGS. 4A, 5A, 6A and 7A show the spherical aberration, FIGS. 4B, 5B, 6B and 7B show the astigmatism, and FIGS. 4C, 5C, 6C and 7C show the distortion. FIGS. 4A–4C show the aberrations when the focal length is 16.5 mm. FIGS. 5A–5C, 6A–6C and 7A–7C respectively show the aberrations when the focal length is 76.3 mm, 288 mm, and 528 mm.

Figure 8:
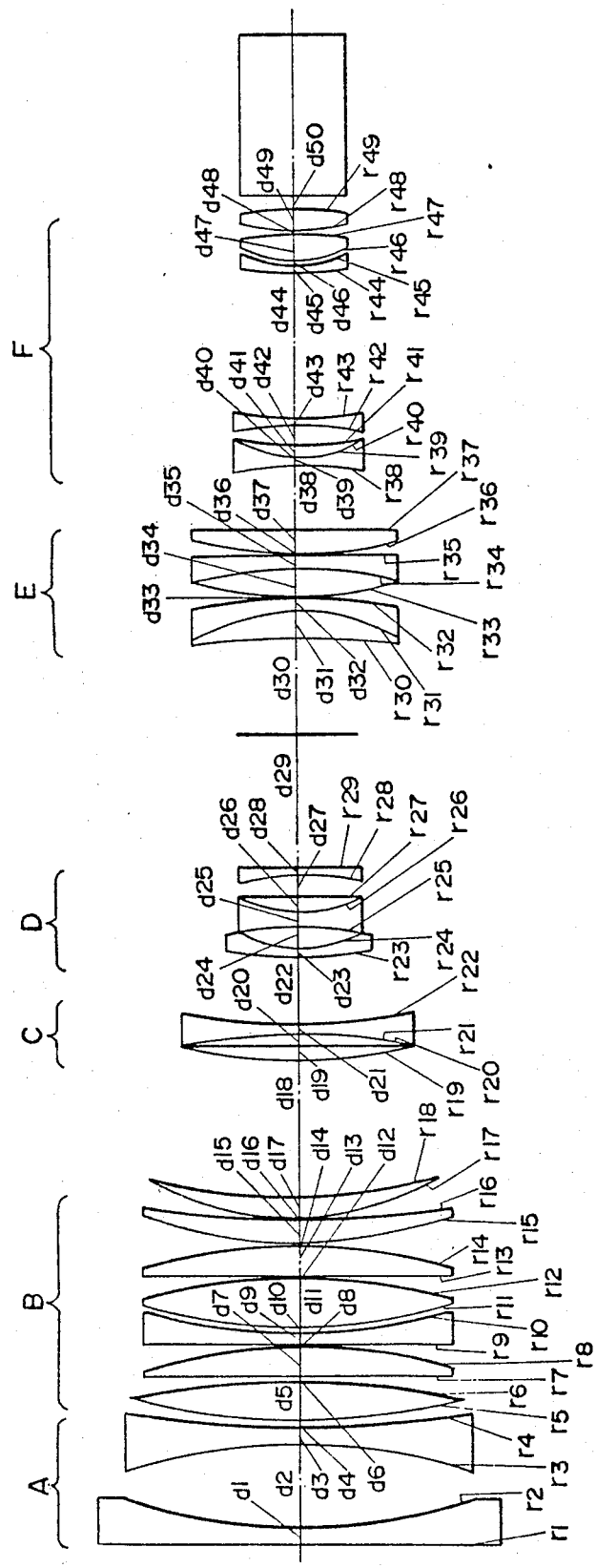
FIG. 8 is a longitudinal sectional view of an embodiment of the zoom lens system in accordance with the present invention.
Figure 9A:
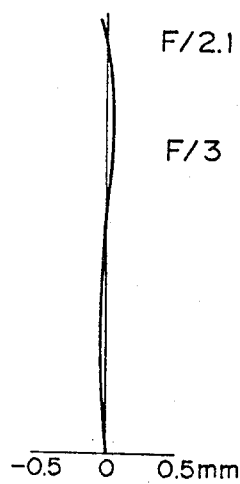
FIGS. 9A to 9C, 10A to 10C, 11A to 11C, and 12A to 12C are graphs similar to FIGS. 4A to 7C showing the various aberrations of the embodiment shown in FIG. 8.
Figure 9B:
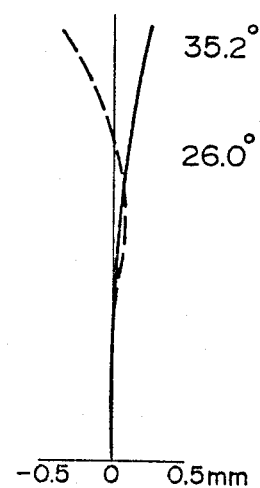
Figure 9C:
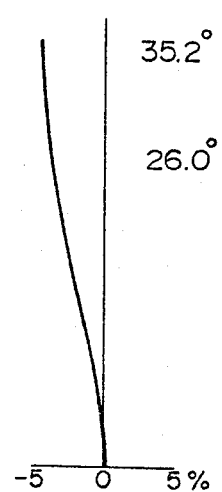
Figure 10A:
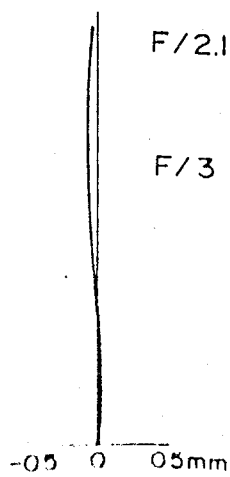
Figure 10B:
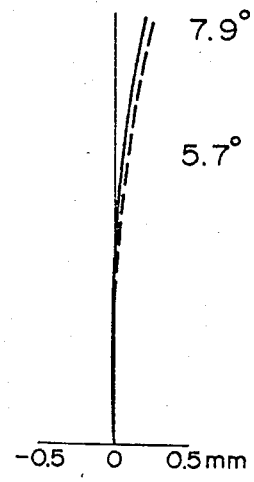
Figure 10C:
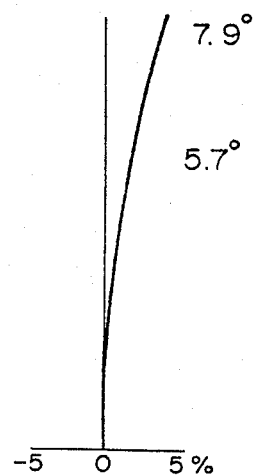
Figure 11A:
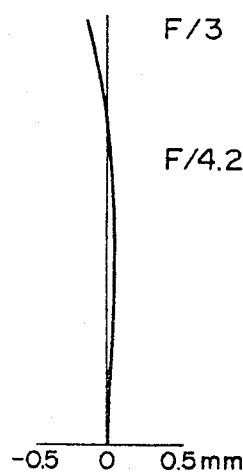
Figure 11B:
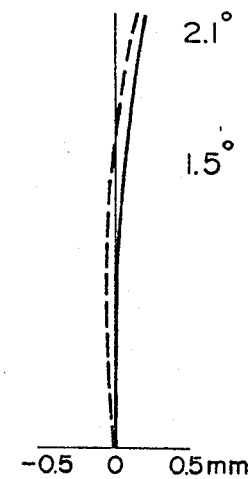
Figure 11C:
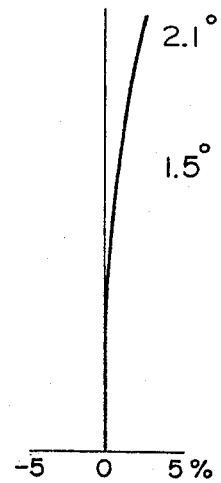
Figure 12A:
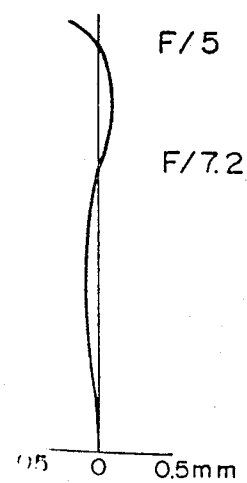
Figure 12B:
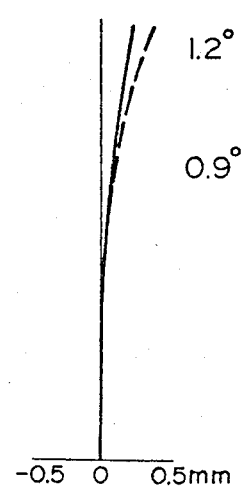
Figure 12C:
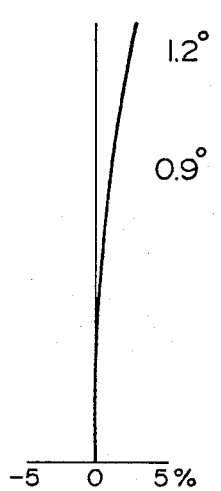

FIG. 8 shows another embodiment of the present invention in which the compensating lens C consists of a group of spherical lenses C' having a small refractive power as a whole. All the reference numerals are equivalent to those used in FIG. 2, and accordingly, the detailed description thereof will be omitted here. The various conditions of the second embodiment will be described in Table II below.

TABLE II f = 16–480 F: 2–1
zooming ratio: 30.0 ×
angle of view: 67°33'–2°33'

| | R | d | n | ν |
|---|---|---|---|---|
| 1 | −5208.33 | 5.0 | 1.71300 | 53.9 |
| 2 | 207.47 | 36.5 | | |
| 3 | −167.11 | 5.0 | 1.71300 | 53.9 |
| 4 | 448.83 | 0.75 | | |
| 5 | 403.88 | 12.5 | 1.80158 | 25.5 |
| 6 | −422.70 | 2.22 | | |
| 7 | −2350.20 | 10.5 | 1.62041 | 60.3 |
| 8 | −207.23 | 0.2 | | |
| 9 | −687.05 | 4.2 | 1.80158 | 25.5 |
| 10 | 244.31 | 0.62 | | |
| 11 | 237.23 | 20.0 | 1.43386 | 95.2 |
| 12 | −224.05 | 0.2 | | |
| 13 | 1574.54 | 13.5 | 1.43386 | 95.2 |
| 14 | −193.61 | 0.2 | | |
| 15 | 154.53 | 11.0 | 1.43386 | 95.2 |
| 16 | 534.36 | 0.2 | | |
| 17 | 129.39 | 7.5 | 1.62041 | 60.3 |
| 18 | 213.38 | (d18) | | |
| 19 | 198.75 | 7.0 | 1.73400 | 51.3 |
| 20 | 1950.68 | 2.0 | | |
| 21 | −846.91 | 2.0 | 1.51823 | 59.0 |
| 22 | 161.68 | (d22) | | |
| 23 | 151.86 | 2.0 | 1.71300 | 53.9 |
| 24 | 45.66 | 10.5 | | |
| 25 | −100.77 | 2.0 | 1.73400 | 51.3 |
| 26 | 53.29 | 9.5 | 1.92286 | 20.9 |
| 27 | −5598.50 | 6.0 | | |
| 28 | −94.15 | 2.0 | 1.77252 | 49.6 |
| 29 | 388.84 | (d29) | | |
| 30 | iris | (d30) | | |
| 31 | −224.97 | 15.0 | 1.69100 | 54.8 |
| 32 | −55.69 | 2.0 | 1.80158 | 25.5 |
| 33 | −84.28 | 0.2 | | |
| 34 | 177.50 | 15.5 | 1.69100 | 54.8 |
| 35 | −95.54 | 2.5 | 1.80158 | 25.5 |
| 36 | −554.84 | 0.2 | | |
| 37 | 128.87 | 8.5 | 1.62041 | 60.3 |
| 38 | −595.49 | (d38) | | |
| 39 | −142.26 | 2.0 | 1.71300 | 53.9 |
| 40 | 65.05 | 0.2 | | |
| 41 | 45.61 | 6.5 | 1.74000 | 28.2 |
| 42 | 278.10 | 5.0 | | |
| 43 | −192.65 | 2.0 | 1.62041 | 60.3 |
| 44 | 114.26 | 57.5 | | |
| 45 | 130.44 | 2.0 | 1.80518 | 25.5 |
| 46 | 38.69 | 1.5 | | |
| 47 | 41.62 | 10.0 | 1.51742 | 52.2 |
| 48 | −116.52 | 0.2 | | |
| 49 | 147.33 | 7.5 | 1.53172 | 48.9 |
| 50 | −146.18 | | | |
| 51 | ∞ | 69.2 | 1.51633 | 64.0 |
| 52 | ∞ | | | |

| | f = 16 | f = 74 | f = 280 | f = 512 |
|---|---|---|---|---|
| d18 | 1.500 | 67.801 | 128.008 | 136.135 |
| d22 | 2.000 | 27.000 | 2.000 | 2.000 |
| d29 | 163.431 | 59.765 | 13.809 | 0.796 |
| d30 | 48.000 | 38.857 | 17.490 | 3.213 |
| d38 | 7.500 | 29.009 | 61.124 | 80.287 |

In accordance with the zoom lens system of the present invention, the distortion which has been considered most difficult to correct in a zoom lens system is effectively corrected, and various aberrations are well corrected over the whole region from a wide angle end of F:2.1, f=16.5 mm and angle of view 68.5° to a telescopic side end of F:5.5, f=530 mm and angle of view 2.3°. Thus, a compact zoom lens system of wide angle, superhigh zooming ratio and large diameter can be obtained.

We claim:

1. A zoom lens system comprising a focusing lens system, a zooming lens system and a relay lens system wherein the improvement comprises a compensating lens provided between a lens group which moves for zooming operation and a lens group which does not move in the zooming operation, said compensating lens being located at a position in a space between said lens groups where a light flux advancing along the optical axis of the zoom lens system converges to the image side, said compensating lens comprising a group of spherical lenses having a small refractive power as a whole, said compensating lens being moved in association with the zooming operation.

2. A zoom lens system as defined in claim 1 wherein said compensating lens is located in front of said zooming lens system.

3. A zoom lens system in accordance with the following table in which R, d, n and ν respectively designate the radii of curvature of the refracting surfaces, the axial air separations or thicknesses of lenses, the refractive indices for the sodium d-line and the Abbe dispersion numbers and in which the lenses are numbered in order from the front to the rear by subscripts:

| | f = 16.5-500 F: 12.1 zooming ratio: 30.3 × angle of view: 65°56'-2°27' | | | |
|---|---|---|---|---|
| No. | R | d | n | ν |
| 1 | 2225.27 | 5.0 | 1.71300 | 53.9 |
| 2 | 131.30 | 12.74 | | |
| 3 | 245.15 | 7.50 | 1.80518 | 25.5 |
| 4 | 411.66 | 21.26 | | |
| 5 | −229.08 | 5.0 | 1.71300 | 53.9 |
| 6 | 1544.05 | 0.75 | | |
| 7 | 270.44 | 8.0 | 1.80518 | 25.5 |
| 8 | 1097.59 | 3.93 | | |
| 9 | 454.71 | 10.0 | 1.62041 | 60.3 |
| 10 | −507.92 | 0.2 | | |
| 11 | −3554.02 | 4.2 | 1.80518 | 25.5 |
| 12 | 203.85 | 0.62 | | |
| 13 | 209.08 | 22.0 | 1.43386 | 95.2 |
| 14 | −227.27 | 0.2 | | |
| 15 | 574.25 | 15.0 | 1.43386 | 95.2 |
| 16 | −273.63 | 0.2 | | |
| 17 | 270.56 | 10.5 | 1.43386 | 95.2 |
| 18 | 4899.63 | 0.2 | | |
| 19 | 151.47 | 9.5 | 1.62041 | 60.3 |
| 20 | 334.52 | (d20) | | |
| 21 | aspheric | 2.0 | 1.51633 | 64.0 |
| 22 | ∞ | (d22) | | |
| 23 | 136.40 | 2.0 | 1.71300 | 53.9 |
| 24 | 42.12 | 10.5 | | |
| 25 | −96.98 | 2.0 | 2.73400 | 51.3 |
| 26 | 38.05 | 9.5 | 1.80518 | 25.5 |
| 27 | −622.59 | 5.0 | | |
| 28 | −90.38 | 2.0 | 1.71300 | 53.9 |
| 29 | 358.25 | (d29) | | |
| 30 | iris | (d30) | | |
| 31 | −356.55 | 2.0 | 1.74000 | 28.2 |
| 32 | 130.08 | 15.0 | 1.73400 | 51.3 |
| 33 | −97.80 | 0.2 | | |
| 34 | 132.19 | 15.5 | 1.69100 | 54.8 |
| 35 | −94.21 | 2.0 | 1.74000 | 28.2 |
| 36 | 7760.09 | 0.2 | | |
| 37 | 134.48 | 8.0 | 1.62041 | 60.2 |
| 38 | 4380.76 | (d38) | | |
| 39 | −150.33 | 2.0 | 1.71300 | 53.9 |
| 40 | 64.90 | 0.2 | | |
| 41 | 44.23 | 6.0 | 1.80518 | 25.5 |
| 42 | 146.86 | 5.0 | | |
| 43 | −212.80 | 2.0 | 1.62041 | 60.3 |
| 44 | 113.87 | 50.0 | | |
| 45 | 134.20 | 2.0 | 1.80518 | 25.5 |
| 46 | 37.97 | 1.5 | | |
| 47 | 41.32 | 10.0 | 1.51742 | 52.2 |
| 48 | −105.10 | 0.2 | | |
| 49 | 154.39 | 7.5 | 1.51742 | 52.2 |
| 50 | −146.54 | | | |
| 51 | ∞ | 69.2 | 1.51633 | 64.0 |
| 52 | ∞ | | | |
| | f = 16.5 | f = 76.3 | f = 288 | f = 528 |
| d20 | 6.000 | 71.783 | 131.944 | 140.825 |
| d22 | 1.000 | 26.000 | 1.000 | 1.000 |
| d29 | 163.696 | 60.547 | 14.639 | 0.872 |
| d30 | 50.000 | 41.149 | 19.550 | 2.725 |
| d38 | 7.500 | 28.717 | 61.064 | 82.775 | aspheric surface
$X = A_2 y^2 + A_4 y^4 + A_6 y^6 + A_8 y^8 + A_{10} y^{10}$
$R_{21} = \infty$
$A_2 = 0$
$A_4 = -6.55424 \cdot 10^{-8}$
$A_6 = 2.730667 \cdot 10^{-11}$
$A_8 = -4.23002 \cdot 10^{-15}$ where y is a distance in the direction perpendicular to the optical axis and X is a distance from the vertex of the surface in the direction of the optical axis.

4. A zoom lens system in accordance with the following table in which R, d, n and ν respectively designate the radii of curvature of the refracting surfaces, the axial air separations or thicknesses of lenses, the refractive indices for the sodium d-line and the Abbe dispersion numbers and in which the lenses are numbered in order from the front to the rear by subscripts:

| | f = 16-480 F: 2-1 zooming ratio: 30.0 × angle of view: 67°33'-2°33' | | | |
|---|---|---|---|---|
| | R | d | n | ν |
| 1 | −5208.33 | 5.0 | 1.71300 | 53.9 |
| 2 | 207.47 | 36.5 | | |
| 3 | −167.11 | 5.0 | 1.71300 | 53.9 |
| 4 | 448.83 | 0.75 | | |
| 5 | 403.88 | 12.5 | 1.80158 | 25.5 |
| 6 | −422.70 | 2.22 | | |
| 7 | −2350.20 | 10.5 | 1.62041 | 60.3 |
| 8 | −207.23 | 0.2 | | |
| 9 | −687.05 | 4.2 | 1.80158 | 25.5 |
| 10 | 244.31 | 0.62 | | |
| 11 | 237.23 | 20.0 | 1.43386 | 95.2 |
| 12 | −224.05 | 0.2 | | |
| 13 | 1574.54 | 13.5 | 1.43386 | 95.2 |
| 14 | −193.61 | 0.2 | | |
| 15 | 154.53 | 11.0 | 1.43386 | 95.2 |
| 16 | 534.36 | 0.2 | | |
| 17 | 129.39 | 7.5 | 1.62041 | 60.3 |
| 18 | 213.38 | (d18) | | |
| 19 | 198.75 | 7.0 | 1.73400 | 51.3 |
| 20 | 1950.68 | 2.0 | | |
| 21 | −846.91 | 2.0 | 1.51823 | 59.0 |
| 22 | 161.68 | (d22) | | |
| 23 | 151.86 | 2.0 | 1.71300 | 53.9 |
| 24 | 45.66 | 10.5 | | |
| 25 | −100.77 | 2.0 | 1.73400 | 51.3 |
| 26 | 53.29 | 9.5 | 1.92286 | 20.9 |
| 27 | −5598.50 | 6.0 | | |
| 28 | −94.15 | 2.0 | 1.77252 | 49.6 |
| 29 | 388.84 | (d29) | | |
| 30 | iris | (d30) | | |
| 31 | −224.97 | 15.0 | 1.69100 | 54.8 |
| 32 | −55.69 | 2.0 | 1.80158 | 25.5 |
| 33 | −84.28 | 0.2 | | |
| 34 | 177.50 | 15.5 | 1.69100 | 54.8 |
| 35 | −95.54 | 2.5 | 1.80158 | 25.5 |
| 36 | −554.84 | 0.2 | | |
| 37 | 128.87 | 8.5 | 1.62041 | 60.3 |
| 38 | −595.49 | (d38) | | |
| 39 | −142.26 | 2.0 | 1.71300 | 53.9 |
| 40 | 65.05 | 0.2 | | |
| 41 | 45.61 | 6.5 | 1.74000 | 28.2 |
| 42 | 278.10 | 5.0 | | |
| 43 | −192.65 | 2.0 | 1.62041 | 60.3 |
| 44 | 114.26 | 57.5 | | |
| 45 | 130.44 | 2.0 | 1.80518 | 25.5 |
| 46 | 38.69 | 1.5 | | |
| 47 | 41.62 | 10.0 | 1.51742 | 52.2 |
| 48 | −116.52 | 0.2 | | |
| 49 | 147.33 | 7.5 | 1.53172 | 48.9 |
| 50 | −146.18 | | | |
| 51 | ∞ | 69.2 | 1.51633 | 64.0 |
| 52 | ∞ | | | |
| | f = 16 | f = 74 | f = 280 | f = 512 |
| d18 | 1.500 | 67.801 | 128.008 | 136.135 |
| d22 | 2.000 | 27.000 | 2.000 | 2.000 |
| d29 | 163.431 | 59.765 | 13.809 | 0.796 |
| d30 | 48.000 | 38.857 | 17.490 | 3.213 |
| d38 | 7.500 | 29.009 | 61.124 | 80.287 |

* * * * *